(12) United States Patent
Lancaster et al.

(10) Patent No.: US 7,169,365 B2
(45) Date of Patent: *Jan. 30, 2007

(54) AUTOMOTIVE EXHAUST COMPONENT AND METHOD OF MANUFACTURE

(75) Inventors: Paul B. Lancaster, Loudon, TN (US); John M. Tursky, Hillsborough, NJ (US)

(73) Assignee: Evolution Industries, Inc., West Caldwell, NJ (US)

( * ) Notice: Subject to any disclaimer, the term of this patent is extended or adjusted under 35 U.S.C. 154(b) by 149 days.

This patent is subject to a terminal disclaimer.

(21) Appl. No.: 10/389,868

(22) Filed: Mar. 18, 2003

(65) Prior Publication Data

US 2003/0194357 A1    Oct. 16, 2003

Related U.S. Application Data

(60) Provisional application No. 60/367,419, filed on Mar. 26, 2002.

(51) Int. Cl.
*B01D 50/00* (2006.01)
*B21D 51/16* (2006.01)

(52) U.S. Cl. .................. 422/179; 422/180; 29/890
(58) Field of Classification Search .............. 422/171, 422/177, 179, 180, 174; 29/890; 60/299, 60/300
See application file for complete search history.

(56) References Cited

U.S. PATENT DOCUMENTS

| | | | |
|---|---|---|---|
| 3,523,590 A | 8/1970 | Straw | 181/61 |
| 3,841,435 A | 10/1974 | Hetherington | 181/54 |
| 4,118,199 A | 10/1978 | Völker et al. | 422/171 |
| 4,206,179 A * | 6/1980 | Oya et al. | 422/180 |
| 4,207,661 A | 6/1980 | Mase et al. | 29/157 |
| 4,425,304 A | 1/1984 | Kawata et al. | 422/171 |
| 4,625,511 A | 12/1986 | Scheitlin et al. | 60/299 |
| 4,782,661 A | 11/1988 | Motley et al. | 60/299 |
| 4,865,818 A | 9/1989 | Merry et al. | 422/179 |

(Continued)

*Primary Examiner*—Glenn Caldarola
*Assistant Examiner*—Tom P. Duong
(74) *Attorney, Agent, or Firm*—Ernest D. Buff & Associates, LLC; Ernest D. Buff; Gordon E. Fish (57) ABSTRACT

A catalytic converter for an internal combustion engine exhaust system comprises a single-piece, seamless metal housing having tubulated gas inlet and outlet ports and a tubulated intermediate section with a catalytic element therein. The intermediate section is connected to the inlet port by an inlet transition section and to the outlet port by an outlet transition section. The inlet and outlet ports and the inlet and outlet transition sections are formed by swaging the ends of a seamless tube used to form the housing. Exhaust gas produced by operation of the engine passes into the converter and through the catalytic element. Noxious substances in the exhaust, including CO, $NO_x$, and incompletely combusted hydrocarbons are converted to more benign substances through the action of the catalytic element, which is preferably a frangible ceramic honeycomb structure having a plurality of internal passages coated with a catalytically active substance. A swaging process is used to form tubulated ends on the converter. The tabulated ends minimize production of turbulence in the gas flow and allow the converter to be connected to the rest of the exhaust system by clamped, welded, or flanged joints. The one-piece, seamless construction of the converter is economical to produce and eliminates welding of housing components that tend to fail when subjected to corrosive exhaust gasses over a prolonged period of time.

12 Claims, 4 Drawing Sheets

U.S. PATENT DOCUMENTS

| | | | | |
|---|---|---|---|---|
| 4,969,264 A | * | 11/1990 | Dryer et al. | 29/890 |
| 5,055,274 A | | 10/1991 | Abbott | 422/171 |
| 5,065,576 A | | 11/1991 | Kanazawa et al. | 60/295 |
| 5,106,588 A | | 4/1992 | Sims et al. | 422/180 |
| 5,118,476 A | | 6/1992 | Dryer et al. | 422/179 |
| 5,119,551 A | | 6/1992 | Abbott | 29/890 |
| 5,216,809 A | | 6/1993 | Abbott et al. | 29/890 |
| 5,329,698 A | * | 7/1994 | Abbott | 29/890 |
| 5,403,559 A | | 4/1995 | Swars | 422/180 |
| 5,523,059 A | | 6/1996 | Langer | 422/179 |
| 5,525,307 A | | 6/1996 | Yasaki et al. | 422/171 |
| 5,724,735 A | | 3/1998 | Ickes et al. | 29/890 |
| 5,829,132 A | | 11/1998 | Sickels et al. | 29/890 |
| 5,853,675 A | | 12/1998 | Howorth | 422/179 |
| 5,857,329 A | | 1/1999 | Bigham | 60/317 |
| 5,866,079 A | | 2/1999 | Machida et al. | 422/179 |
| 5,879,640 A | | 3/1999 | Atmur et al. | 422/180 |
| 5,882,608 A | | 3/1999 | Sanocki et al. | 422/179 |
| 5,953,817 A | * | 9/1999 | Watanabe et al. | 29/890 |
| 5,958,347 A | | 9/1999 | Roychoudhury et al. | 422/179 |
| 5,980,837 A | | 11/1999 | Umin et al. | 422/179 |
| 6,000,131 A | | 12/1999 | Schmitt | 29/890 |
| 6,051,193 A | | 4/2000 | Langer et al. | 422/179 |
| 6,057,263 A | | 5/2000 | Takahashi et al. | 502/439 |
| 6,086,829 A | | 7/2000 | Shea et al. | 422/179 |
| 6,101,714 A | | 8/2000 | Schmitt | 29/890 |
| 6,185,819 B1 | | 2/2001 | Bauer et al. | 29/890 |
| 6,224,835 B1 | | 5/2001 | Langer | 422/179 |
| 6,247,552 B1 | | 6/2001 | Kovar et al. | 181/240 |
| 6,293,010 B1 | | 9/2001 | Umin et al. | 29/890 |
| 6,299,843 B1 | | 10/2001 | Locker et al. | 422/179 |
| 6,324,758 B1 | | 12/2001 | Huang et al. | 29/890 |
| 6,381,843 B1 | | 5/2002 | Irie et al. | 29/890 |
| 6,491,878 B1 | | 12/2002 | Locker et al. | 422/179 |
| 6,497,847 B2 | | 12/2002 | Foster et al. | 422/177 |
| 6,568,078 B2 | | 5/2003 | Eisenstock | 29/890 |
| 6,701,617 B2 | | 3/2004 | Li et al. | 29/890 |
| 2001/0026780 A1 | | 10/2001 | Reuther et al. | 422/177 |
| 2001/0037573 A1 | | 11/2001 | Kuschel et al. | 29/890.148 |
| 2001/0043891 A1 | | 11/2001 | Adiletta | 422/177 |
| 2002/0011002 A1 | | 1/2002 | Bonny et al. | 29/890.08 |
| 2002/0014007 A1 | | 2/2002 | Bonny et al. | 29/890.08 |
| 2002/0054844 A1 | | 5/2002 | Pfeifer et al. | 423/239.1 |
| 2002/0068025 A1 | * | 6/2002 | Foster et al. | 422/179 |
| 2002/0096225 A1 | | 7/2002 | Ishizu et al. | 138/114 |
| 2002/0106312 A1 | | 8/2002 | Harris | 422/168 |
| 2002/0168304 A1 | | 11/2002 | Boehnke et al. | 422/179 |
| 2003/0003030 A1 | | 1/2003 | Knight | 422/177 |
| 2003/0003031 A1 | | 1/2003 | Bruck et al. | 422/180 |
| 2003/0039596 A1 | | 2/2003 | Johnson et al. | 422/173 |
| 2003/0113241 A1 | | 6/2003 | Craig et al. | 422/176 |

* cited by examiner

AUTOMOTIVE EXHAUST COMPONENT AND METHOD OF MANUFACTURE

This application claims the benefit of provisional application No. 60/367,419, filed Mar. 26, 2002.

BACKGROUND OF THE INVENTION

1. Field of the Invention

This invention relates to the field of automotive exhaust components; and more particularly, to a muffler, catalytic converter or the like, that is formed and housed within a seamless enclosure.

2. Description of the Prior Art

It is widely recognized that the exhaust emissions of internal combustion engines constitute a major source of air pollution throughout the world. The combustion process in these engines inevitably results in the production of certain substances that pass into the exhaust stream and are detrimental to the health and well being of humans and other animal and plant species. The emissions of concern include particulates (soot) along with gases such as $CO$, $SO_2$, $NO_x$, and imperfectly burned hydrocarbons (HC). These substances are produced in the combustion process, along with the $CO_2$ and $H_2O$ that are the products of the complete oxidation of the hydrocarbons comprised in fuel.

The combination of market forces and governmental environmental regulations has spurred research and development of ways to mitigate or eliminate the production of the harmful constituents in engine exhaust. Automakers and suppliers have been challenged to control and reduce vehicle tailpipe emissions by the U.S. Clean Air Act of 1965 and subsequent legislation in the U.S. and other countries. In response to this legislation, virtually every system in the engine has been improved. As a result, modern engines more efficiently convert the latent chemical energy in fuels to useful mechanical work, so that their emissions are markedly reduced.

To date the significant efforts have been directed toward the four-stroke Otto engine in passenger automobiles, owing to consumer preferences and government action. Despite progress in emission reduction for these automobile engines, increasingly stringent limits have been imposed. Emission regulations have also extended to other on-road vehicles, such as busses, and trucks, many of which employ diesel engines; to off-road vehicles; and to non-propulsion engines, many of which are two-stroke.

Much of the improved emissions stem from use of catalytic converters through which exhaust gas streams are directed. The passage of the exhaust across a surface comprising a suitable catalyst promotes further chemical reaction that removes a substantial fraction of the noxious $CO$, $NO_x$, and HC substances, converting them instead into more benign substances such as $CO_2$, $O_2$, $N_2$, and $H_2O$. Moreover, use of catalytic converters in combination with computer-driven, adaptive control of timing and fuel-air mixture gives an engine designer significant flexibility when optimizing engine-operating parameters to achieve reduced emissions.

Notwithstanding the market pull coming from the significant advantages realized by interposition of catalytic converters in the exhaust stream there remain substantial impediments to their manufacture. It would be desirable if converters could be manufactured using reliable, efficient and inexpensive construction processes; maintained durability and functionality over a prolonged service life. However, conventional converters fail to afford these desirable characteristics.

Converter constructions must produce a gas-tight enclosure so that exhaust enters solely at an inlet port and exists exclusively through an outlet port. Failure to achieve a hermetic sealing deleteriously allows leakage of exhaust gas, circumventing the beneficial effect of the catalyst and producing unacceptable noise. In some cases, leakage of exhaust containing combustible gases can lead to engine backfiring and damage to other portions of the engine system. Leakage can also expose vehicle occupants to unhealthy or dangerous levels of CO and other emissions. In addition, leaks have been known to trigger catastrophic vehicle fires.

Understandably, automobile manufacturers are impelled by several factors to minimize or eliminate these catalytic converter failures. The reputation of a manufacturer as a supplier of a high-quality product is degraded by reported failures. In addition, both market forces and current U.S. environmental regulations compel an auto manufacturer to warranty the integrity and efficacy of all aspects of an auto's pollution control system. More specifically, the regulations require that the system function to maintain the auto's emissions within established standards for an extended period of time and mileage. Any failures expose the manufacturer to costly warranty repairs and to the ire of an inconvenienced consumer.

Heretofore, the metal housings used for catalytic converters have mostly fallen into three broad categories of construction: a "pancake" or "clamshell" form, a wrapped form, and a multipiece form, each of which encloses a catalytic substrate bearing catalytically active material.

Typically, the "pancake" or "clamshell" form comprises stamped upper and lower shells, which are substantially identical to each other, and which have mating, peripheral, side flanges that are welded together to lie in a plane containing the longitudinal axis of the housing. They are shaped to form an internal chamber in which the catalytic substrate is mounted by "L-shaped" or other known brackets or pre-formed features provided integrally in the housing component shells.

The wrapped-form housing is made with material that initially is sheet-like and formed so as to generally encircle the catalytic substrate. This form is also known as a "tourniquet wrap," reflecting its construction. The edges of the housing must be joined at a welded seam that runs essentially the full axial length of the converter. The inlet and outlet ports in this construction may either be formed as part of the wrapping operation or, more commonly, may comprise separate components welded to the ends of the housing subsequent to the formation of the sheet material.

Several multipiece housing constructions are known. One form disclosed by U.S. Pat. No. 5,118,476, comprises a tubular middle section in which the catalytic substrate is placed and end bushings attached to each end of the middle section. U.S. Pat. No. 6,001,314 discloses a two-piece housing. Each of the pieces is shaped by deep drawing to provide an open end and a conical outer end tapered to an opening appointed for connection to associated exhaust system pipes. The two pieces are welded together with the catalytic substrate contained within.

Each of these multi-piece constructions must be sealed by welding, either to close a seam in a sheet-like material or to affix appropriate end caps. The welding is needed both to provide the required hermetic sealing of the housing and to secure the catalytic substrate. However, each of these welds is a likely failure mode. Moreover, the OBD2 (on-board diagnostics) standard mandated by the U.S. Environmental Protection Agency for passenger vehicles after 1996 imposes a further need for hermetic integrity in the engine exhaust system. This standard mandates measurement of $O_2$ content before and after the catalytic converter as a required input for the computerized engine control system. Even a pinhole leak in the system between the sensors compromises the accuracy of the comparison in $O_2$ levels which is used for a mass balance determination. The emissions control system fails, negating the ability of the engine control system to adaptively optimize timing and fuel/air mixture to minimize emissions. Such failure of the emissions control system must be corrected under warrantee by the vehicle manufacturer at considerable expense and inconvenience to the consumer.

The environment of a catalytic converter is harsh for a multiplicity of reasons, each of which can potentially cause penetrating corrosion and ultimate failure of the converter housing. For example, a converter used in an on-road vehicle, especially in cold climates, is exposed externally to a spray of road salt and internally to acidic exhaust gases. It is well known in the art that chemical and stress effects combine to make weldments especially likely loci of corrosive attack. Accordingly, a catalytic converter housing that could be formed efficiently and economically into a single piece without welding has long been sought in the automotive art. Such a one-piece catalytic converter housing would overcome serious shortcomings involving the reliability of extant multi-piece and welded housing forms.

The only known technique for producing single-piece housings is spinning. In this process, a catalytic element is placed within a tube and the combined workpieces are rapidly spun about the tube's cylindrical axis while suitable tools are brought into contact with the tube at each of its ends. Sufficient deformation is thus accomplished to form tubular ports of reduced diameter at each end of the tube. Depending on the required reduction, the spinning may be carried out either cold or hot. While the spinning approach does produce a single-piece housing, it also carries substantial drawbacks. The production forming is expensive and energy-intensive to conduct. Moreover, it results in formation of circumferential ridges on both the inside and outside surfaces of the housing in the deformed region. These ridges are both unattractive and present significant disruption of the gas flow inside the muffler, causing turbulence and undesirable back pressure that reduce the engine power available for a given cylinder displacement. The magnitude of diameter reduction achievable by spinning is limited. In addition, substantial work hardening is produced in the metal in the reduced section. As a result, the ductility of the tube in the reduced section, including the port tubulation, is too low to allow the converter to be attached to adjoining exhaust sections by ordinary clamps. Welded or flanged joints must be used instead. The need for welding joints is particularly inconvenient for aftermarket and repair use.

The spinning process is further limited by the size and shape of product that it can produce. Very long shapes are unwieldy to secure and spin at the required rate in available lathes and similar machine tools. Moreover devices produced by spinning must be rotationally symmetric about a cylindrical axis, or the resulting imbalance makes it impossible to spin the device and accomplish the needed forming of the desired shape. In many cases the circuitous path available for the exhaust system would make it highly desirable to have non-symmetric components available, such as a catalytic converter in which the inlet and outlet ports need not be coaxially aligned, but angulated or offset relative to one another. Such configurations cannot be formed by known spinning methods. Furthermore, areas of the housing formed by spinning are work-hardened to an extent that renders subsequent bending and like operations virtually impossible.

As a result of these deficiencies, spinning is not widely used in the manufacture of exhaust components, notwithstanding the eagerness of the market for a viable single-piece, seamless device which spinning might be thought capable of producing.

SUMMARY OF THE INVENTION

The present invention provides a catalytic converter for an internal combustion engine exhaust system having a single-piece, seamless metallic housing, and a method for constructing the converter. The catalytic converter comprises: (i) a tubulated gas inlet port in the housing through which exhaust gas is introduced; (ii) a tubulated gas outlet port in the housing through which the exhaust gas is discharged; (iii) a tubulated intermediate section of the housing having an inlet end and an outlet end; (iv) an inlet transition section connecting the inlet port and the inlet end of said intermediate section; (v) an outlet transition section connecting the outlet end of the intermediate section and the outlet port; and (vi) a catalytic element contained within the intermediate section and through which the exhaust gas passes when flowing between the gas inlet port and the gas outlet port. The interior surfaces of the inlet and outlet transition sections and the gas inlet and outlet ports are smooth and substantially free from ridges thereon. The inlet and outlet ports and the inlet and outlet transition sections are formed by swaging the ends of a seamless tube used to form the housing.

Exhaust gas produced by operation of the engine passes into the converter and through the catalytic element. Noxious substances in the exhaust, including CO, $NO_x$, and incompletely combusted hydrocarbons are converted to more benign substances through the action of the catalytic element, which preferably comprises a frangible ceramic honeycomb structure having a plurality of internal passages coated with a catalytically active substances.

Advantageously, the one-piece, seamless converter construction of the invention is economical to produce and eliminates welding of housing components that are highly prone to failure. More specifically, the one-piece, seamless construction of the converter housing reduces the size and number converter parts (as compared with known practical constructions) while, at the same time, increasing the converter's effectiveness and improving its construction and manufacture. The converter is inherently economical to produce and can be mass-manufactured in the large volumes required to supply original equipment converters directly to manufacturers of automobiles and trucks for factory installation in exhaust systems. Furthermore, the improvement of the housing affords additional advantages including better vehicle fuel efficiency and better manufacturing economics.

The elimination of any welding of seams or end caps afforded by the one-piece construction of the present catalytic converter greatly enhances its reliability during service. Welds are notoriously vulnerable as loci of corrosive attack due both to chemical and stress effects. In operation, catalytic converters in typical on-road vehicle applications are exposed externally to road salt and other corrosive substances and internally to acidic exhaust gases. The absence of weldments in the present catalytic converter removes a prime source of failures during the service life of the device.

The manufacture of the catalytic converter of the invention comprises use of swaging processes to form the tubulated ends of the catalytic converter. The central section of the housing, being generally larger in inner dimension than the ends, envelops and holds the catalytic element in position. Swaging is used in the practice of this invention generally to reduce the ends of the housing to a tube diameter appointed for connection of the converter to the adjoining components of the engine exhaust system.

Compared to other known methods used to form ends, swaging affords a number of advantages. The reduction in diameter can be carried out in a sequence of steps using a plurality of dies. As a result, the swaging process is highly adaptable, providing a designer with great flexibility in tailoring a housing to fit into an available space and in optimizing the dynamics of gas flow through the device. The tubulated ends and transition sections are smooth and substantially free of circumferential ridges on either the inside or outside surfaces. The external appearance of the device is enhanced. The smoothness of the inside surface and the absence of ridges thereon minimizes generation of turbulence that impedes the flow of exhaust gas through the converter and causes excessive backpressure. Swaging maintains a level of ductility sufficient to allow the converter to be connected to the rest of the exhaust system by clamped, welded, or flanged joints.

A further advantage of the present method over spinning is its ability to form more intricate structures, including those having features such as extended length and bends or other non-symmetrical configuration. Since the present end-forming process does not entail rapid rotation of the workpiece, neither balance nor the size of available lathes or similar machine tools is a consideration. Structures need not have a cylindrical axis of rotational symmetry. End-forming can thus produce converters having inlet and outlet ports which are angulated or offset relative to one another. A converter could also be formed with bends in any of its sections. Designs can also be formed wherein the catalytic element is an oval cylinder instead of a right circular cylinder.

In one aspect of the invention the catalytic element comprises a frangible ceramic honeycomb structure having a plurality of passages extending therethrough. The surfaces of the passages are substantially covered with a finely dispersed, catalytically active substance. This construction makes effective use of the catalytic substance, which generally comprises one or more of the expensive platinum-group noble metals including Pd, Pt, and Rh. The ceramic honeycomb is preferably encircled with a mat of an intumescent material which acts to resiliently and insulatively secure it within the inside diameter of the intermediate section. The intumescence of the mat material creates a reliable and gas-tight seal that protects the ceramic during its construction and in-service life. In addition, the intumescent material forces the exhaust gas stream to pass through the passages of the honeycomb, maximizing catalytic efficacy.

BRIEF DESCRIPTION OF THE DRAWINGS

The invention will be more fully understood and further advantages will become apparent when reference is had to the following detailed description of the preferred embodiments of the invention and the accompanying drawings, wherein like reference numerals denote similar elements throughout the several views and in which.

DESCRIPTION OF THE PREFERRED EMBODIMENTS

The present invention is directed to a catalytic converter, muffler, pre-catalytic converter, or the like, incorporated in the exhaust system of an internal combustion engine. Generally stated, the catalytic converter is housed in a single-piece, seamless metallic housing preferably made of a corrosion-resistant metal alloy such as a stainless steel alloy. The housing has tubulated gas inlet and outlet ports through which exhaust gas is introduced and discharged, respectively. The converter also comprises a catalyst element contained within a tubulated intermediate section of the housing. During its passage through the converter, exhaust gas is caused to flow over the surface of the catalyst element. A catalytically active material present on the catalyst element promotes chemical reactions that purify the gas stream. This is accomplished by converting certain chemical species therein to other species which are generally considered not harmful to life or the environment, or which present a significantly reduced danger.

Figure 1:
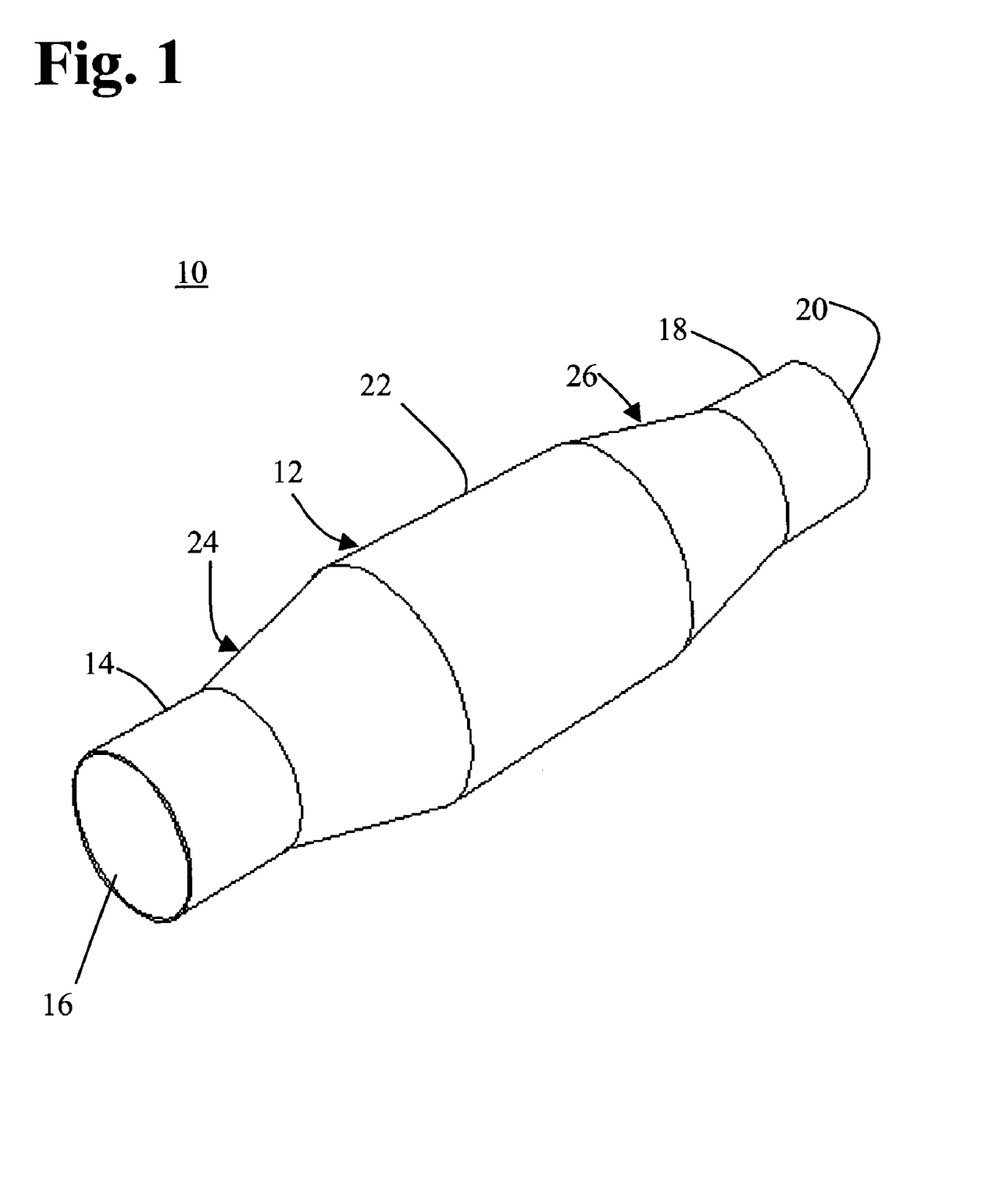
FIG. 1 is a perspective view of a catalytic converter in accordance with the invention.
Figure 2:
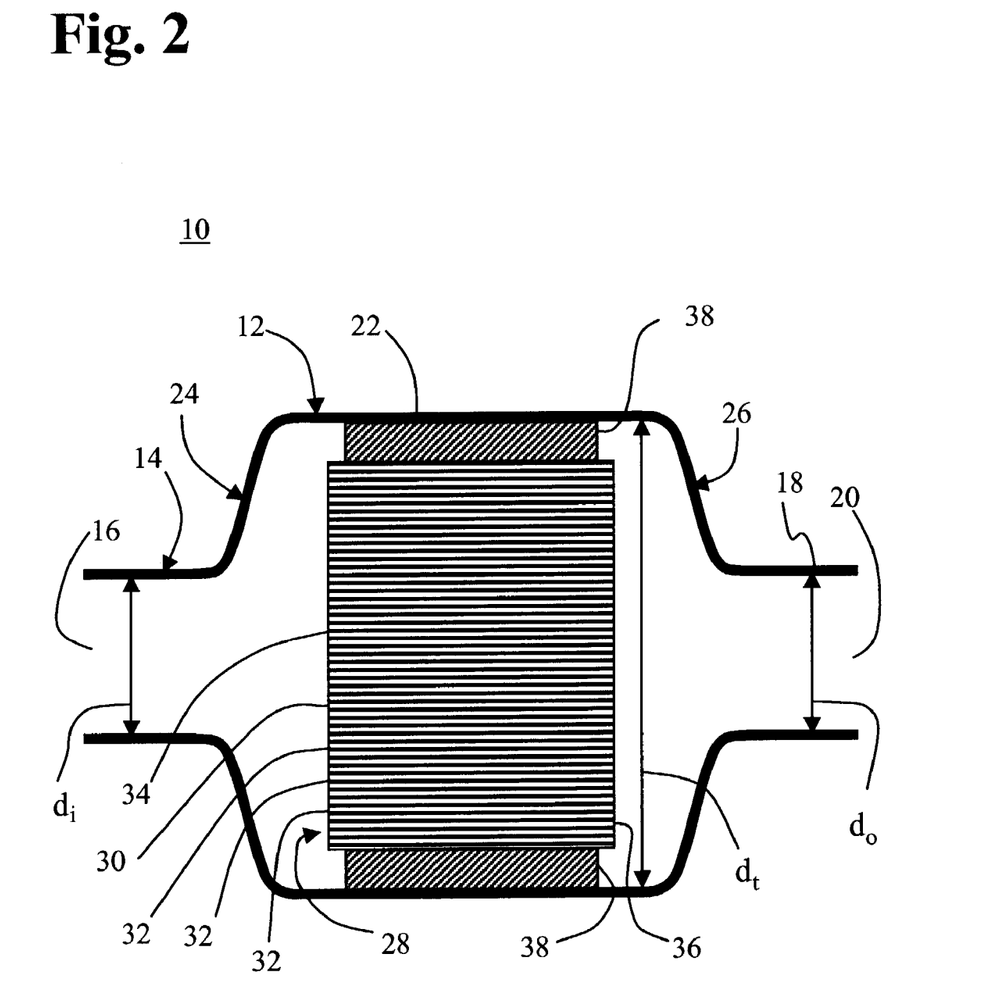
FIG. 2 is a longitudinal, cross-sectional view along the axial mid-plane of the catalytic converter depicted by FIG. 1.

Referring now to FIGS. 1 and 2 there is shown generally at 10 a catalytic converter comprising one aspect of the invention. The catalytic converter 10 has a one-piece, seamless metal housing composed of a corrosion-resistant metal, preferably stainless steel. The embodiment depicted by FIG. 1 is generally cylindrical, having a round cross-section at each point along its axial length. Housing 12 is generally tubular in shape, and is provided with tubulated gas inlet port 14 having inlet orifice 16 and tubulated gas outlet port 18 having outlet orifice 20. Converter 10 is appointed for use in the exhaust system of an internal combustion engine (not shown). Inlet port 14 is connected to tubulated intermediate section 22 of housing 12 by inlet transition section 24. Intermediate section 22 is connected to outlet port 18 through outlet transition section 26. Exhaust gas produced during operation of the internal combustion engine enters the converter through inlet orifice 16 in inlet port 14. The exhaust gas then passes successively through inlet transition section 24, intermediate section 22, and outlet transition section 26, before being discharged through outlet orifice 20 of outlet port 18. Inlet and outlet ports 14, 18 of converter 10, though of reduced diameter owing to the manufacturing process described hereinafter, are not work hardened. As a result, the ports, 14, 18 of converter 10 can be readily connected to other components of the exhaust to produce welded, clamped, and flanged joints by suitable means known in the engine art.

The arrangement of the components inside the catalytic converter 10 of FIG. 1 is best seen in the cross-sectional view of FIG. 2. Converter 10 further comprises catalytic element 28. In an aspect of the invention catalytic element 28 comprises a generally cylindrical, frangible, heat-resistant ceramic honeycomb substrate 30 having a large number of passages 32 thereto, each of the passages 32 running generally parallel to the cylindrical axes of both substrate 30 and intermediate section 22. Passages 32 are generally arranged in a honeycomb pattern or a similar array. Passages 32 extend completely through substrate 30, thereby allowing the passage of gas from one end 34 of element 28 to the other end 36 thereof. In an aspect of the invention substrate 30 is composed of cordierite. Other ceramic materials having adequate strength, thermal shock resistance, heat resistance, and chemical compatibility both with the exhaust gas stream and catalyst material applied thereto may also be used. The interior surfaces of passages 32 are substantially covered with a substance catalytically active to induce the chemical reaction of substances present in engine exhaust for the purification thereof. In some aspects of the invention, catalytic element 28 may comprise a plurality of ceramic or other substrates arranged sequentially or in parallel, e.g. to achieve better gas flow, to provide more than one type of catalyst, or to facilitate manufacture of a longer converter. Sequentially disposed substrates may be in substantially abutting relationship or may be separated by a free space which may be desired for optimizing gas flow.

One skilled in the art will also appreciate that while the aspect shown in FIGS. 1 and 2 is cylindrically symmetric, the invention also contemplates aspects in which bends, angulations, and other non-symmetric features may be present. The intermediate section may be oval or "pancake" shaped and have a catalyst element of mating shape therein. In addition, the inlet and outlet ends may be extended to serve as portions of the engine exhaust system. While this extension entails additional forming steps, the corresponding reduction in the number of parts in the total engine exhaust system is advantageous both for simplifying assembly and for eliminating otherwise required joints that are also prone to corrosion failure.

The present catalytic converter may advantageously employ a variety of known catalytically active substances. Many of these substances contain noble metals such as Pt, Pd, and Rh. As a result of the needs to (i) use these high cost materials as efficiently as possible and (ii) maximize the catalytic surface's effective area, the catalyst material is generally provided in a finely divided form coated on, and adhered to, a catalytic substrate. Suitable catalyst materials include three-way catalysts appointed to convert nitrous oxides, carbon monoxide, and hydrocarbons to nitrogen, water, and carbon dioxide. Means for selecting a suitable catalyst material and for ascertaining the specific activity and the effective surface area of a catalytic material are well known in the catalyst art. The converter may also comprise an oxidation catalyst and means (not shown) for supplying secondary air to intermediate section 22 so as to promote conversion of carbon monoxide and hydrocarbons to water and carbon dioxide. Other forms of catalyst substrate, including metallic catalyst support systems, may also be used in the practice of the present invention.

Ceramic substrate 30 is preferably supported and held securely in sealing contact within intermediate section 22 by a generally encircling mat 38. The mat is preferably resilient, insulative, and shock absorbent and may be composed of a gas impervious, vermiculite based material, available in the open market. The material is intumescent, that is, it expands substantially upon heating. Typically a mat having an initial thickness of approximately ¼" is used. During assembly of converter 10, mat 38 is wrapped to substantially encircle the ceramic substrate 30 and cover at least a portion of its longitudinal or axial length. Preferably, a short portion of the cylindrical periphery of the ceramic substrate 30 at each of its ends 34, 36 is left uncovered by mat, as depicted by FIG. 2. Preferably, the axial length uncovered at each end ranges from about half to three times the thickness of the mat. This holdback ensures that portions of the mat do not break off and block any of the passages through honeycomb structure 30. The wrapped mat 38 is compressed radially to a thickness approximately half of its initial thickness prior to insertion of the combined substrate 30 and mat 38 into the inner diameter of intermediate section 22 to secure the positioning of the combined assembly within the converter housing 12.

One form of mat suitable for the practice of the invention comprises a flexible intumescent sheet, which may be used for mounting automotive catalytic converter monoliths. The sheet comprises an unexpanded vermiculite produced by subjecting vermiculite ore containing interlamellar cations to a potassium nitrate solution for a time interval sufficient to ion-exchange interlamellar cations within the ore with potassium ions; an inorganic fibrous material; and a binder. The sheet material may be provided with, or temporarily laminated to, a backing sheet of kraft paper, plastic film, non-woven synthetic fiber web, or the like. Another suitable form of intumescent sealing mat 38 is available on the market under the trade name of "3M INTERAM MAT." Suitable intumescent sealing mat is also sold commercially by Unifrax as type "XPE."

Advantageously the intumescence of mat 38 ensures the secure mounting of catalytic substrate 30 within the converter housing. In addition, the intumescent mat 38 seals the gap between the outside cylindrical surface of catalytic substrate 30 and the inside cylindrical surface of intermediate section 22. This "sealing action" forces substantially all the gas flowing into the converter 10 through inlet port 16 to pass through internal passages 32 in substrate 30 before exiting through outlet port 18. Efficacy of the catalytic material coating the surface of internal passages 32 is thereby enhanced, since exhaust gas is maximally exposed thereto. The resiliency of mat 38 serves to cushion and protect frangible substrate 30 during the initial fabrication of converter 10. Moreover, mat 38 retains this resiliency even after repeated thermal cycling. The constituents of converter 10 experience differential thermal expansion and contraction during each cycle of heatup, operation, and cool-down of the engine wherein exhaust passes through converter 10. By virtue of maintaining its resiliency, mat 38 is able to protect substrate 30 from damage due to this pattern of differential expansion, while still maintaining an adequate degree of sealing during the entirety of each operating cycle.

While the aspect of the invention depicted by FIG. 1 comprises a catalytic converter employing a catalyst dispersed and supported on a ceramic substrate, other forms of catalyst and substrate may also be used in the practice of the invention. For example, a catalyst may be dispersed on a metallic substrate, which may take the form of corrugated metal foil that is coiled upon itself to form a generally cylindrical structure having a plurality of passages longitudinally extending therethrough. Since metals are substantially less frangible and tougher than known ceramic catalyst substrates, a metal catalytic support of this form may allow elimination of intumescent material 38 in the construction of converter 10.

A variety of metallic alloys are suitable for the housing of the invention. Alloy selection is made on the basis of cost and the level of performance required with respect to temperature capability, durability, and corrosion resistance needed. For automotive use, ferritic stainless steels are commonly used, including various 400-series alloys. Most commonly 409SS and SAE51409 alloys are employed. For small engines, including non-propulsion applications, and other instances where cost considerations are dominant, carbon steels are frequently used. For demanding applications wherein especially long life and high corrosion resistance are desired, such as marine engines, austenitic and 300-series stainless steel alloys such as 304SS are generally employed.

The catalytic converter of the invention may be manufactured in a wide range of sizes to accommodate the requirements of different engines, which may range from small engines of a few horsepower or less, such as might be used in lawn mowers, snow blowers, weed trimmers, and similar off-road, non-propulsion applications, to large diesel engines used in trucks. Many present automotive applications employ ceramic substrates commercially available in standard diameters of 2.5 and 4 inches. Automotive converters are typically about 9 to 20 inches in total length. Small, non-propulsion engines may employ substrates as small as 1 inch diameter or even less and may be only a few inches long. The minimum length of the substrate is generally determined by the flow velocity and the amount of time the exhaust gas must be at the catalytic surface to achieve a chemical reaction that sufficiently reduces the concentration of pollutants. The total length of the converter is then determined both by the length of the active catalyst and the required shaping of the transition sections and the inlet and outlet ports. Often the inlet and outlet ports of a converter are approximately half the diameter of the substrate to reduce exhaust flow impedance. The tapering of the inlet transition and outlet transition sections may range from very gradual to very abrupt. For automotive applications the transition sections are often chosen with a straight taper of 10–15° for simplicity. However, curved transitions are generally advantageous for better aerodynamics. In one aspect of the invention, the intermediate section is cylindrical and the length of the inlet and outlet transition sections is chosen so that each length ranges from about 30% to 100% of the diameter of the intermediate section.

The catalytic converter shown in FIGS. 1–2 and described hereinabove is of the so-called under-floor type normally disposed under the floor of an automotive vehicle for reasons of available space. However, it will be understood by one skilled in the art that the principle of the present invention may be applied to catalytic converters of many different types, including those types appointed to be mounted proximate the exhaust manifold of an internal combustion engine. These types are sometimes denoted as pre-cat catalytic converters if mounted within about thirty-six inches of the manifold or as pre-light catalytic converters if mounted within about eight inches of the manifold. Additionally, it will be appreciated that the principle of the present invention may be applied to the manufacture of catalytic converters for a variety of internal combustion engines other than those of an automotive vehicle, and converters that are integrated with mufflers, resonators, or other similar components in the exhaust system.

In accordance with the invention, the inlet and outlet transition sections and the inlet and outlet ports of the catalytic converter are formed by swaging. In the aspect of the invention depicted in FIGS. 1–2, the converter housing 12 is formed from a cylindrical metallic tube, the diameter of which is uniform through its length. The ends of the tube are swaged to form the transition sections 24, 26 and the ports 14, 18 with mat 38 and substrate 30 being located in intermediate section 22. As depicted by FIG. 2, the inside diameter of intermediate section 22 through substantially its entire length is $d_r$. A swaging operation forms transition section 24 and inlet port 14, tapering the tube smoothly to a diameter of $d_i$ in the inlet port region, so that inlet port 14 may be attached to the preceding component of the exhaust system. A swaging operation is also used to form outlet transition section 26 and outlet port 18. The diameter $d_o$ of outlet port 18 may be the same as diameter $d_i$ of inlet port 14. Alternatively, different diameters may be selected to accommodate the requirements of the exhaust system.

Figure 3:
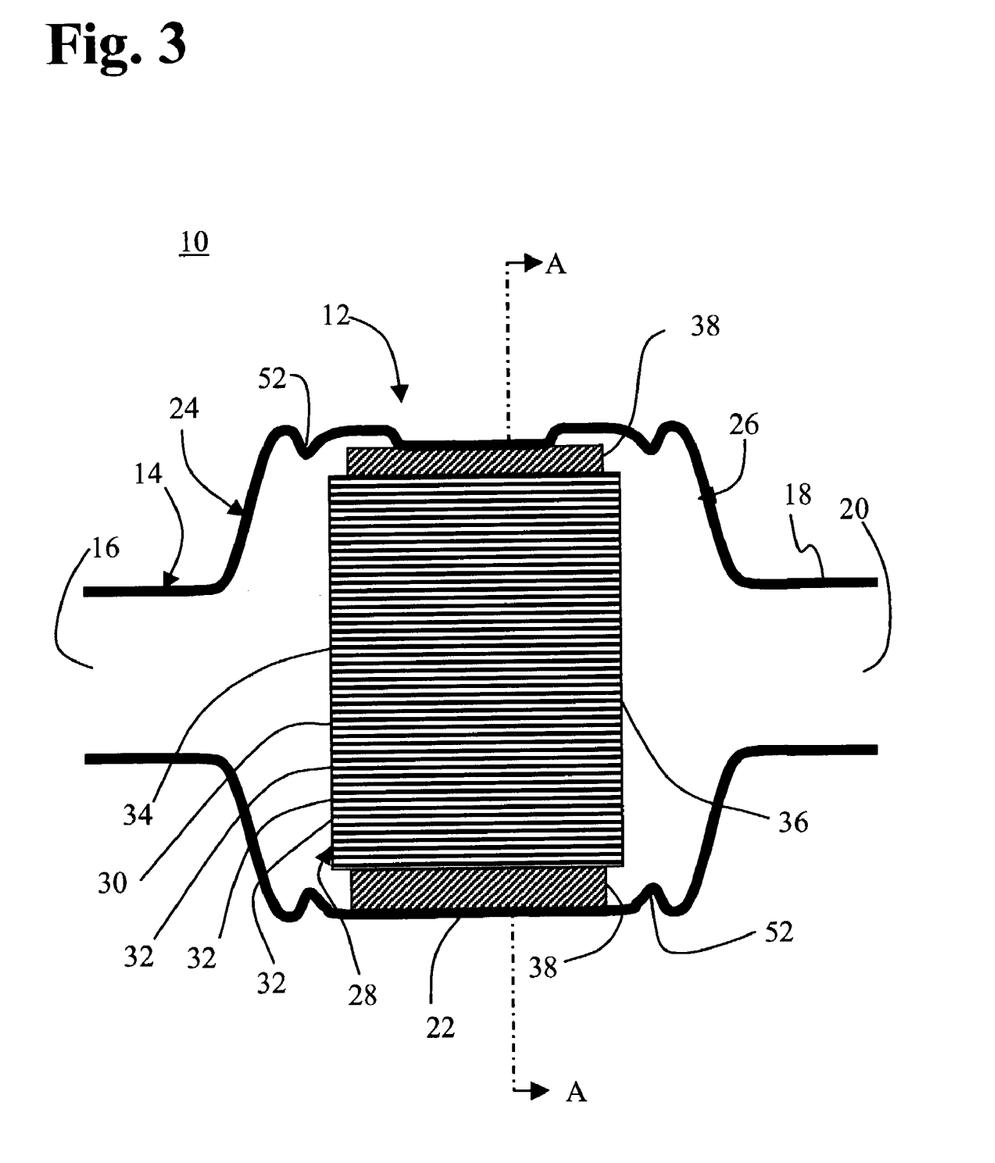
FIG. 3 is a longitudinal, cross-sectional view along the axial mid-plane of a catalytic converter in accordance with another aspect of the invention.
Figure 4:
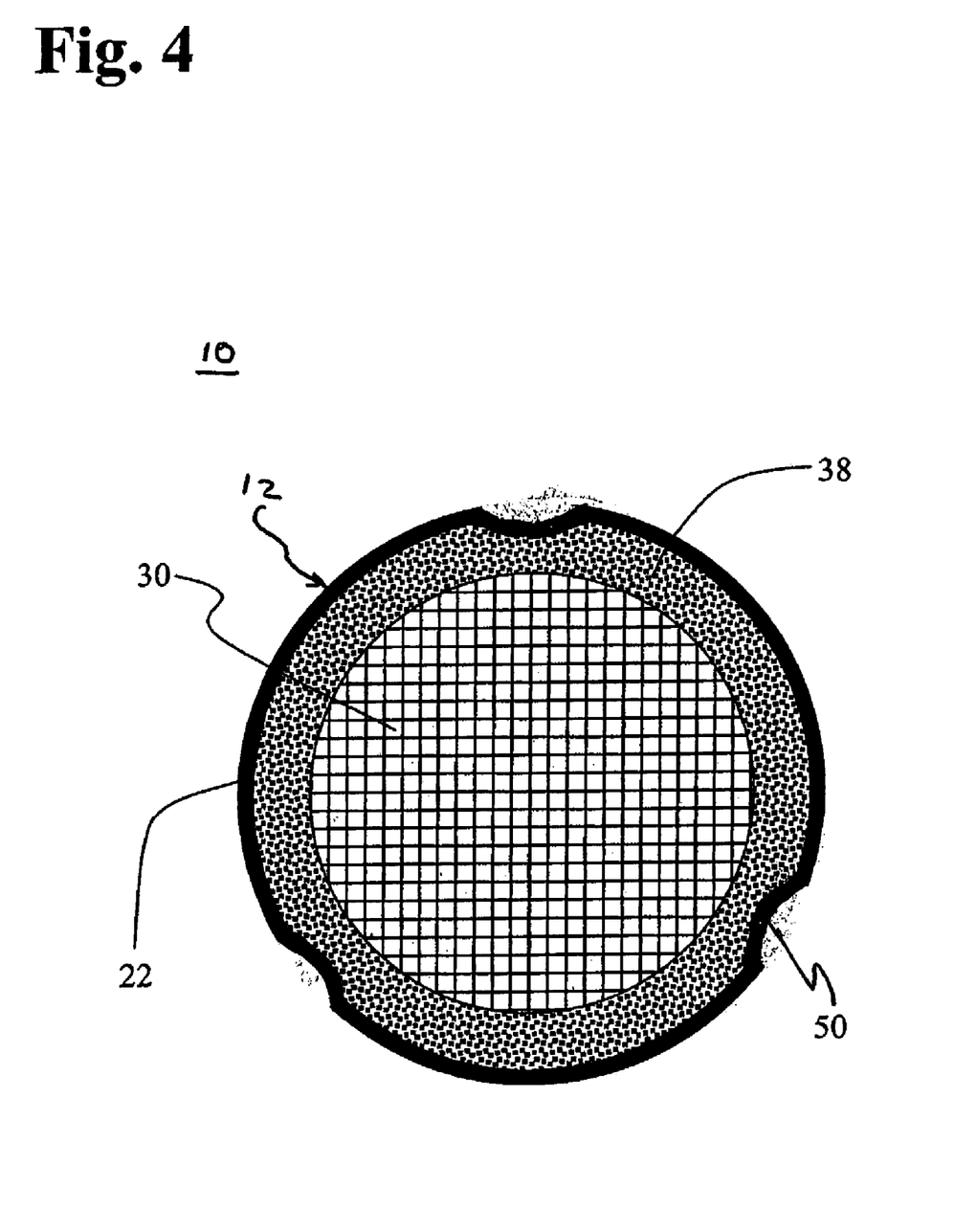
FIG. 4 is an axial cross-sectional view taken in the intermediate section of the converter depicted by FIG. 3.

In FIGS. 3 and 4 there is shown an aspect of the invention comprising a variation of the form of the housing 12 depicted by FIGS. 1 and 2. In this aspect, further swaging is optionally applied to intermediate section 22 of housing 12 to form therein a plurality of rib-like indentations 50, which are axially elongated along intermediate section 22. Preferably indentations 50 extend along a substantial portion of intermediate section but do not extend to inlet and outlet transition sections 24, 26. The cross-sectional view of FIG. 4, taken at lines A—A shown by FIG. 3, depicts an aspect in which three such indentations are present. Preferably indentations 50 extend radially inward to a depth of at most half the thickness of intumescent mat 38. They act to further support and constrain mat 38 and substrate 30 from axial movement and to assure sealing of the mat/substrate assembly within the walls of housing 12. Indentations 50 should not be so deep as to cause fracture of substrate 30.

FIG. 3 also depicts optional circumferentially-extending indentations 52 at the junction between inlet transition section 24 and intermediate section 22 and at the junction between intermediate section 22 and outlet transition section 26. These indentations 52 serve to support and constrain substrate 30 from moving axially. If present, these indentations are preferably of a depth less than or about equal to the thickness of the mat. This indentation in some cases also advantageously improves the uniformity of gas flow across presented at the face area of substrate 30. In other embodiments a screen, baffle, or similar structure may also be used to protect the inlet and outlet of the ceramic substrate from the intrusion of foreign matter and to improve gas flow.

The swaging used to form each of the ends of converter housing 12 is carried out by mechanically forcing a die over each end of the tube, the force being applied in a generally axial direction and the die being designed to cause flow of the metal and thereby reduce the tube's diameter while maintaining its circularity. Preferably, the swaging is carried out in a plurality of swaging steps using a plurality of dies to form each end of the converter housing 12. A suitable sequence of dies may further be used to achieve a desired profile in the transition section. The profile may be as simple as a cone, but preferably comprises a more complicated pattern having a combination of curvatures in which there is no discontinuity in the slope of the inside surface of the converter in its axial direction. In one aspect of the invention both ends of the housing are swaged simultaneously by applying oppositely directed compressive forces to dies on each end using hydraulically driven rams.

The flexibility in choosing the profile of the transition sections of the present converter is highly advantageous. The profile is characterized, in part, by the curvature at each point along the length of the transition sections and the overall rapidity with which the sections taper. A converter designer must satisfy several constraints. The overall length of the converter may be limited to a maximum length by available space. The required gas flow rate, allowable impedance to gas flow, and required extent of exposure of the exhaust to active catalyst, along with available forms of substrate and the geometry of the passages therethrough, generally constrain the area and length required for the catalytic element. In addition, properly designed transition sections advantageously maintain a generally laminar flow of exhaust gas and minimize the generation of unwanted turbulence therein. This turbulence undesirably increases the impedance of the catalytic converter and results in excessive back pressure. The absence of the above-mentioned discontinuity in slope in the transition sections, together with suitable transition profiles with gradually tapered diameters, minimizes this turbulence.

A further advantage of swaging over other forming techniques, such as spinning, is its ability to produce reduced sections while maintaining smoothness of both the interior and exterior surfaces of the converter. When properly carried out, significant reductions in diameter can be made without producing internal and external circumferential ridges that are typically produced by spinning.

Advantageously the swaging technique results in an exterior surface that is smooth and aesthetically appealing, minimizing its vulnerability to pitting, corrosion, or like attack, and rendering it easily finishable by plating or other coating operations. The swaging technique also produces a smooth inner surface without significant ridges. If present, such ridges on the interior surface of an exhaust component are a further source of undesirable turbulence, as previously discussed.

A further disadvantage of techniques such as spinning is the amount of work hardening that results in the reduced section. This work hardening is highly detrimental in that it leaves the inlet and outlet ports with a ductility level that is insufficient to allow the ports to be reliably and hermetically attached to other exhaust components by clamping. Instead, joints have to be made using welds or flanges, which are more expensive and difficult to implement, especially with after-market installations.

In an aspect of the method of the invention the forming process is carried out semicontinuously. Seamless tubes having substantially the diameters desired for the intermediate section are supplied in long lengths. From these tubes are cut preforms adapted to be formed into the catalytic converter housing. Ceramic substrates are provided having the desired diameter and length. Each substrate is wrapped with an intumescent mat to form the catalytic element. The mat is compressed and the combined assembly inserted into the free end of the supply tube. The supply tube is then gripped circumferentially and its free end is swaged to form the inlet port and inlet transition section. Subsequently, the supply tube is cut to remove a portion thereof having a requisite preselected length, thereby defining the preform. The preform is then re-gripped and the other end swaged to form the outlet port and outlet transition section. Most of the steps of this process are easily automated to provide a high level of manufacturing efficiency and process control, thereby minimizing production costs.

In another aspect of the method of the invention, performs are cut to length from a seamless tube having substantially the diameter desired for the intermediate section of the converter. A ceramic substrates having the requisite length is wrapped with an intumescent mat to form the catalytic element and inserted approximately in the middle of each preform. The preform is then placed in a hydraulic ram assembly having swaging dies coaxially aligned and adapted to be forced compressively over each of the preform's ends, thereby simultaneously swaging each end. A plurality of dies are sequenced into a hydraulic ram and used stepwise to accomplish the desired reduction to the final inlet and outlet port diameters and to form the inlet and outlet transition sections. Alternatively, a plurality of rams are used, with the preform being indexed between rams, which are appointed with a desired sequence of dies to progressively swage the ends in a plurality of graduated swaging stages.

The following example is presented to provide a more complete understanding of the invention. The specific techniques, conditions, materials, proportions and reported data set forth to illustrate the principles and practice of the invention are exemplary and should not be construed as limiting the scope of the invention.

EXAMPLE 1

Preparation and Testing of a Catalytic Converter

A catalytic converter of a type commonly used for emissions reduction from an automobile engine was formed using a catalytic element comprising a conventional platinum-group noble metal type of catalyst supported on the walls of multiple passages extending through a cordierite ceramic honeycomb structure. The honeycomb structure was about 3.6 inches in diameter and 3 inches long. The housing for the converter was formed from a seamless tube of 409 stainless steel alloy having an outside diameter of about four inches and 0.049 inch walls. The honeycomb structure was wrapped with an intumescent mat compressed to about 0.12 inches thickness, and the combined mat and ceramic were then inserted into the center part of the generally tubular converter housing. The ends of the housing were then end-formed to provide an inlet port section and an outlet port section, each of which having a diameter of two inches and a length of two inches. Tapered transition sections about two inches long joined the inlet and outlet sections to the central section.

The converter was subjected to standard tests known in the automotive industry and conformed to procedures set forth in 40 CFR 85.2116. The following tests were conducted.

The expansion of the intumescent mat material was tested by a dial-gage technique. The mat was heated to a maximum temperature of 825° C. and its expansion was measured and found to exhibit a maximum of about 120–130% relative to its initial thickness. This value is well within the usual range known in the art to result in satisfactory sealing and positioning of a ceramic substrate in a catalytic converter housing.

The cold push-out resistance of the ceramic substrate was measured by a standard mechanical pressing technique. The experiment was carried out by gripping the converter housing and exerting mechanical force through an arbor pressing axially on the substrate. It was found that a force of about 60–80 pounds was required to initiate shear of the intumescent mat and cause displacement of substrate. The observed force was well within standards recognized in the art, in which movement at less than about 30 pounds indicates an inadequately supported and sealed substrate, while movement at over about 200 pounds is indicative of excessive engagement of the substrate by the intumescent mat that is likely to result in chipping or brittle failure of the substrate during converter use.

The catalytic efficiency of the converter was measured by a sweep test using gas chromatographic analysis of the conversion efficiency for known CO, HC, and $NO_x$ pollutants to benign substances. Minimal back-pressure was observed, confirming the adequacy of flow through the converter, including the catalytic substrate. Satisfactory catalytic efficiency performance was observed, indicating the suitability of the converter for use in an automotive application that achieves compliance with applicable emissions standards.

The results of the foregoing tests establish that a one-piece, seamless converter satisfactorily demonstrates performance sufficient to meet requirements for emissions mitigation in an automotive application.

Having thus described the invention in rather full detail, it will be understood that such detail need not be strictly adhered to but that various changes and modifications may suggest themselves to one skilled in the art, all falling within the scope of the present invention as defined by the subjoined claims.

What is claimed is:

1. A catalytic converter for an internal combustion engine exhaust system, comprising the converter having interior and exterior surfaces and:
   a. a single-piece, seamless metallic housing;
   b. a tubulated gas inlet port in said housing through which exhaust gas is introduced;
   c. a tubulated gas outlet port in said housing through which the exhaust gas is discharged;
   d. a tubulated intermediate section of said housing having an inlet end and an outlet end, said intermediate section having a plurality of rib-like indentations which are axially elongated along said intermediate section;
   e. an inlet transition section connecting said inlet port and said inlet end of said intermediate section;
   f. an outlet transition section connecting said outlet end of said intermediate section and said outlet port; and
   g. a catalytic element contained within said intermediate section and through which said exhaust gas passes when flowing between said gas inlet port and said gas outlet port; the interior surfaces of said intermediate section said inlet and outlet transition sections and said gas inlet and outlet ports having been swaged and being smooth and substantially ridge-free.

2. A catalytic converter as recited by claim 1, wherein said catalytic element comprises:
   a. a ceramic substrate having a plurality of passages extending therethrough; and
   b. a catalytically active material present on a substantial portion of the surface of each of said passages.

3. A catalytic converter as recited by claim 2, further comprising an intumescent mat encircling said ceramic substrate and sealing the external surface of said ceramic substrate to the inner surface of said intermediate section.

4. A catalytic converter as recited by claim 1, wherein each of said catalytic element and said intermediate section has a length, and said length of said catalytic element is at least about 80% of the length of said intermediate section.

5. A catalytic converter as recited by claim 1, wherein said intermediate section is substantially cylindrical and has diameter, each of said inlet and outlet transition sections has a length, and said length of each of said inlet and outlet transition sections ranges from about 30% to 100% of said diameter of said intermediate section.

6. A catalytic converter as recited by claim 5, wherein:
   a. said catalytic element comprises a ceramic substrate having a diameter, a plurality of passages extending therethrough, and a catalytically active material present on a substantial portion of the surface of each of said passages; and
   b. said inlet port has an inlet diameter and said outlet port has an outlet diameter, and said inlet and outlet diameters are approximately one half of said diameter of said substrate.

7. A catalytic converter as recited by claim 1, wherein said metallic housing is composed of a stainless steel alloy.

8. A catalytic converter as recited by claim 1, wherein said exterior surface of said catalytic converter is smooth.

9. A catalytic converter as recited by claim 1, wherein said rib-like indentations extend along a substantial portion of said intermediate section.

10. An internal combustion engine system having an exhaust system comprising a catalytic converter, said catalytic converter comprising:
    a. a single-piece, seamless metallic housing;
    b. a tubulated gas inlet port in said housing through which exhaust gas is introduced;
    c. a tubulated gas outlet port in said housing through which the exhaust gas is discharged;
    d. a tubulated intermediate section of said housing having an inlet end and an outlet end, said intermediate section having a plurality of rib-like indentations which are axially elongated along said intermediate section;
    e. an inlet transition section connecting said inlet port and said inlet end of said intermediate section;
    f. an outlet transition section connecting said outlet end of said intermediate section and said outlet port; and
    g. a catalytic element contained within said intermediate section and through which said exhaust gas passes when flowing between said gas inlet port and said gas outlet port;
the interior surfaces of said intermediate section said inlet and outlet transition sections and said gas inlet and outlet ports having been swaged and being smooth and substantially ridge-free.

11. A catalytic converter for an internal combustion engine exhaust system, comprising:
    a. a single-piece, seamless metallic housing;
    b. a tubulated gas inlet port in said housing through which exhaust gas is introduced;
    c. a tubulated gas outlet port in said housing through which the exhaust gas is discharged;
    d. a tubulated intermediate section of said housing connecting said gas inlet port and said gas outlet port, said intermediate section having a plurality of rib-like indentations which are axially elongated along said intermediate section;
    e. an inlet transition section connecting said inlet port and said inlet end of said intermediate section;
    f. an outlet transition section connecting said outlet end of said intermediate section and said outlet port; and
    g. a catalytic element contained within said intermediate section and through which said exhaust gas passes when flowing between said gas inlet port and said gas outlet port;
the interior surfaces of said intermedicate section said inlet and outlet transition sections and said gas inlet and outlet ports having been swaged being smooth and substantially ridge-free;
said catalytic converter having been produced by a process comprising:
    i. providing a seamless metallic tube having a first end and a second end;
    ii. inserting said catalytic element in said tube;
    iii. gripping said tube;
    iv. swaging said first end to form said gas inlet port and said inlet transition section; and
    v. swaging said second end to form said gas outlet port and said outlet transition section; and
    vi. swaging said intermediate section to a reduced diameter.

12. A catalytic converter as recited by claim 11, wherein said swaging is carried out using a plurality of swaging steps.

* * * * *